United States Patent
Latz et al.

(10) Patent No.: US 8,662,038 B2
(45) Date of Patent: Mar. 4, 2014

(54) TRACTION MECHANISM DRIVE WITH A COMPENSATING DEVICE FOR VIBRATION REDUCTION

(75) Inventors: Steffen Latz, Munich (DE); Stefan Belmer, Anzing (DE)

(73) Assignee: iwis motorsysteme GmbH & Co. KG, Munich (DE)

( * ) Notice: Subject to any disclaimer, the term of this patent is extended or adjusted under 35 U.S.C. 154(b) by 1257 days.

(21) Appl. No.: 12/439,616

(22) PCT Filed: Jul. 27, 2007

(86) PCT No.: PCT/EP2007/006688
§ 371 (c)(1),
(2), (4) Date: Jul. 24, 2009

(87) PCT Pub. No.: WO2008/028541
PCT Pub. Date: Mar. 13, 2008

(65) Prior Publication Data
US 2009/0293823 A1     Dec. 3, 2009

(30) Foreign Application Priority Data

Sep. 4, 2006 (DE) .......................... 10 2006 041 417

(51) Int. Cl.
*F01L 1/34* (2006.01)
(52) U.S. Cl.
USPC ..................................... 123/90.17; 123/192.1
(58) Field of Classification Search
USPC ..................... 123/90.15–90.18, 192.1, 192.2; 464/180
See application file for complete search history.

(56) References Cited

U.S. PATENT DOCUMENTS

| | | | |
|---|---|---|---|
| 5,655,416 A | 8/1997 | Mott et al. | |
| 6,606,922 B2 * | 8/2003 | Case et al. | 464/180 |

(Continued)

FOREIGN PATENT DOCUMENTS

| | | |
|---|---|---|
| DE | 40 00 875 A1 | 7/1991 |
| DE | 40 10 856 A1 | 10/1991 |

(Continued)

OTHER PUBLICATIONS

Japanese Patent Office, Examination Report for Japanese Patent Application No. 2009-527026 (Mar. 22, 2011).

*Primary Examiner* — Thomas Denion
*Assistant Examiner* — Daniel Bernstein
(74) *Attorney, Agent, or Firm* — Leydig, Voit & Mayer, Ltd.

(57) ABSTRACT

The present invention relates to a traction drive with a compensating device for vibration reduction of a driven shaft, for example a camshaft, a water pump shaft or an injection pump shaft of an internal combustion engine, having a drive wheel which is coupled to the shaft, having a drive means, and having at least one compensating mass which is relatively movable in the traction drive and having at least one actuating mechanism for moving the compensating mass. Here, the compensating mass is movable in or counter to the rotational direction of the shaft, and the actuating mechanism is formed as a tangentially acting actuator for moving the compensating mass. The invention also relates to a method for vibration reduction in a traction drive, having a driven shaft, a drive wheel and a drive means, wherein at least one actuating mechanism moves at least one compensating mass which is relatively movable in the traction drive, having the steps: activating the actuating mechanism, moving the compensating mass and generating a compensating torque at the driven shaft. In the case of a control drive with a camshaft adjusting system for the angular adjustment of the control time, the camshaft which is movable relative to the traction drive can simultaneously be used as a compensating mass for vibration reduction.

17 Claims, 5 Drawing Sheets

(56) References Cited

U.S. PATENT DOCUMENTS

Figure 2:
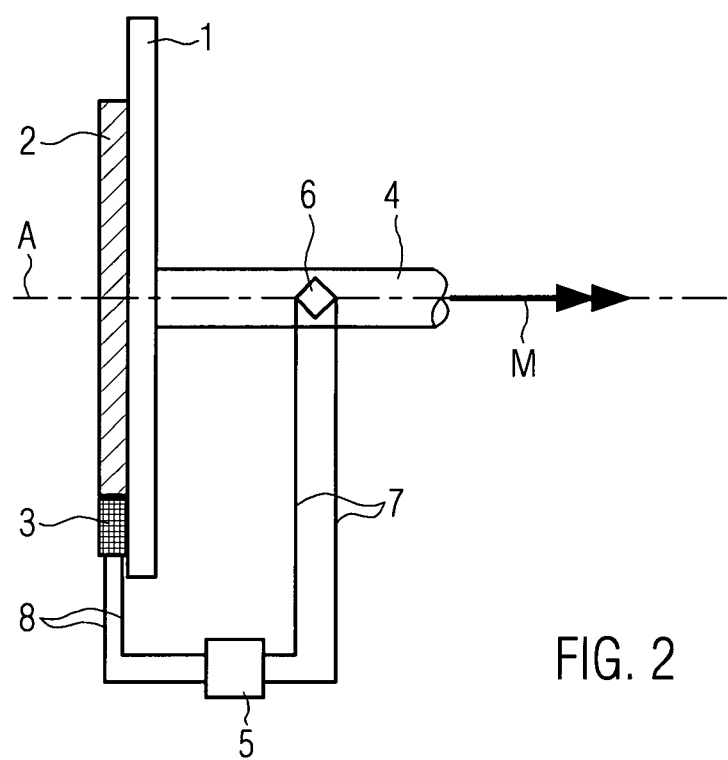

| | | | |
|---|---|---|---|
| 6,609,985 B2 | 8/2003 | Todd et al. | |
| 7,004,291 B2 * | 2/2006 | Schankin et al. | 188/266.1 |
| 7,182,052 B2 * | 2/2007 | Yaoko et al. | 123/90.17 |
| 7,490,585 B2 * | 2/2009 | Friedrich | 123/192.2 |
| 7,950,280 B2 * | 5/2011 | Haimer | 73/470 |
| 2003/0132076 A1 * | 7/2003 | Berti et al. | 188/378 |
| 2004/0069092 A1 * | 4/2004 | Schankin et al. | 74/574 |

FOREIGN PATENT DOCUMENTS

| | | |
|---|---|---|
| DE | 199 08 437 C1 | 9/2000 |
| EP | 0 604 391 A2 | 6/1994 |
| EP | 1 219 943 A2 | 7/2002 |
| EP | 1 643 156 A1 | 4/2006 |
| JP | 59111035 A | 6/1984 |
| JP | 06-330712 A | 11/1994 |
| JP | 10-169703 A | 6/1998 |
| JP | 2000-337429 A | 12/2000 |
| JP | 2001-329812 A | 11/2001 |
| JP | 2002-061703 A | 2/2002 |
| JP | 2003-148569 A | 5/2003 |
| WO | WO 01/98745 A1 | 12/2001 |
| WO | WO 2006/010607 A1 | 2/2006 |

\* cited by examiner

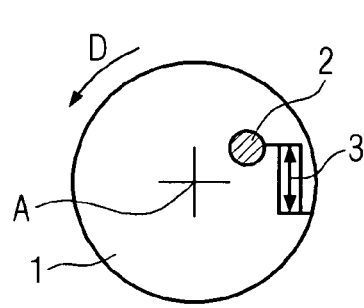
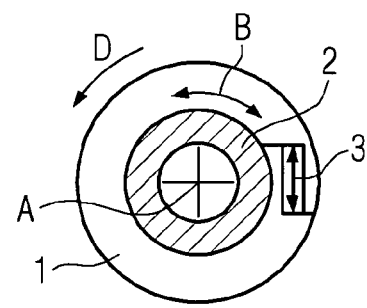
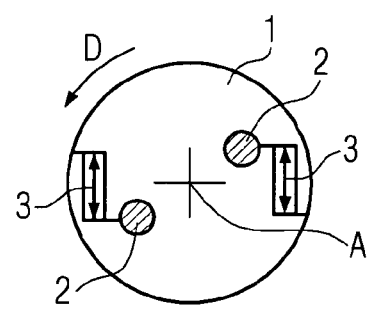
FIG. 1a    FIG. 1b    FIG. 1c
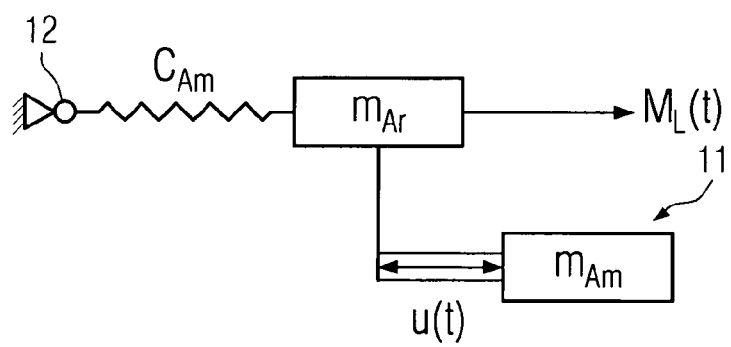
FIG. 1d

TRACTION MECHANISM DRIVE WITH A COMPENSATING DEVICE FOR VIBRATION REDUCTION

The present invention relates to a traction drive with a compensating device for vibration reduction in the traction drive, in particular for an internal combustion engine, with a driven shaft, a drive wheel, which is coupled to the driven shaft, a drive means, at least one compensating mass in the traction drive, which is relatively movable in or counter to the rotational direction of the shaft, and at least one actuating mechanism for moving the at least one compensating mass. Furthermore, the invention relates to the use of a camshaft adjusting system for vibration reduction in a traction drive and an appropriate method for vibration reduction in a traction drive.

In the development of modern motor vehicles the so-called NVH behaviour (noise, vibration and harshness) is becoming increasingly important. Apart from the purchaser's desire for a high level of vibration comfort, lower noise and vibration stresses on the driver also contribute to active safety. In addition, the vibration stresses particularly influences the service life of components and, when dimensioning the affected components, lead to reinforced dimensions.

In a motor vehicle a large number of components arise simultaneously as excitation sources for vibration and noise. However, the vibration and noise excitation of the power train play a dominant role, in particular torque excitation of the crankshaft and camshaft. These dynamic stresses on the power train continue dominantly throughout the whole motor vehicle and are superimposed on all other acoustic and vibration sources.

From DE 40 10 856 A1 a mass and force compensation of driven engine shafts, in particular the crankshaft, is known, in which two compensating shafts provided with compensating weights are arranged spaced from the crankshaft and mutually spaced from one another. The two compensating shafts are both driven from the crankshaft and rotate in opposite directions. A significant disadvantage of this so-called Lanchester compensation is that it takes up a relatively large amount of installation space, which increases the overall size of the engine and makes it heavier. Furthermore, the compensating shafts need additional bearings and the drive of the compensating shafts increases the frictional losses in the engine.

An improvement in the Lanchester compensation is described in DE 199 08 437 C1, in which a compensating shaft interacts with a gearwheel with compensating weights supported on a crankshaft journal in order to reduce the frictional losses and the required installation space of this type of compensating device.

Furthermore, the development of a torque compensation for a camshaft is known, in which a mass support with four radially movable compensating masses is mounted on the camshaft and the compensating masses are moved radially against the compression force of a spring by a fixed cam profile when the shaft rotates. This device facilitates a significant reduction in the dynamic torques for a rotational speed and an order of vibration. The disadvantages of this torque compensation device are the increased mass-support torques and the restriction of compensation to a certain curve of torque excitation, normally for one vibration order and a certain rotational speed.

In recent years many different solutions for reducing the noise and vibration stresses on the power train have been suggested which have sometimes proven beneficial within the scope of their application. The currently intensive efforts to further improve the NVH behaviour in motor vehicles demand in particular further development efforts also in the dominating acoustic and vibration source of the power train. Furthermore, solutions known from the state of the art are normally orientated to the compensation of the maximum vibration stress in the resonance range, i.e. optimised to one order of vibration and one rotational speed range. This means that the dynamic stress on the drive is still relatively high over a large operational range and also for other orders of vibration. A further reduction in the vibration stress, in particular in the alternating torques in the power train, is therefore desirable, particularly to improve the durability of the drive chain or drive belt. Furthermore, a cost reduction could be achieved through the downsizing effects in the dimensioning of the power train.

The object of the present invention is therefore to provide a traction drive with a compensating device for vibration reduction in order to compensate the dynamic components of the vibrations in the traction drive for an internal combustion engine or at least to reduce them and thereby to avoid as far as possible the disadvantages of known solutions.

This object is resolved with a generic traction drive with a compensating device for vibration reduction in that the at least one actuating mechanism is formed as a tangentially moving, actively acting actuator to move the at least one compensating mass in and/or counter to the rotational direction of the shaft for vibration reduction in the traction drive.

The compensating mass, which is arranged relatively movable in and/or counter to the rotational direction of the shaft, generally rotates in the system of the traction drive with and about the axis of the shaft when it rotates. A movement of the compensating mass relative to the other components of the traction drive is caused by the tangentially moving actuator, wherein the movement of the compensating mass in or counter to the rotational direction of the shaft and indexed by the actuator has at least a substantial, tangential component with a portion of over 50% of the resulting force vector, preferably over 80%. In line with the impressed force/time relationship, the compensating mass, force-excited by the actively acting actuator, causes a reactive torque in the driven shaft, which can be used for the compensation of an existing dynamic component of the vibrations of the traction drive. This, in contrast to conventional vibration compensating devices, essentially kinematic application of force facilitates, through the displacement capability of the momental vector, a relatively free arrangement and free formation of the at least one compensating mass relative to the other components of the traction drive, e.g. on a mass support. Due to the direct generation of torque in the driven shaft, firstly only low masses and secondly only small relative displacements are required for producing a suitable reactive torque.

In contrast to passively reacting actuating mechanisms, e.g. a compressed spring, which is initiated to produce a reaction through external excitation in the form of a movement or force transfer, an actively acting actuator, e.g. electrical drives, operates without an external mechanical excitation via the actuation by an active medium, electrical signal or pulse and produces a force-transferring, mechanical movement.

With camshafts, for the angular adjustment of the control time, so-called camshaft adjusting systems are known in which the camshaft is adjusted relative to the drive wheel which is fixed by the drive means, e.g. using hydraulics. In contrast to the traction drive with a compensating device according to the invention, the relative movement of the camshaft causes a pure adaptation of the control time to the combustion state in the combustion chambers of the engine which is influenced by global engine aspects, e.g. operating temperature, combustion, exhaust composition and power spectrum. In comparison to the rotational speed of an internal combustion engine, the angular adjustment of the camshaft occurs over very long time periods so that through the angular adjustment of the control time with a camshaft adjusting system and with regard to one revolution of the driven shaft, no effective torque arises and not even a compensating torque is produced for compensating the dynamic portion of the vibrations of the traction drive.

In principle, the device according to the invention can be used for all drives of shafts where a shaft is driven by a drive means via a drive wheel. Here, apart from control drives of internal combustion engines also injection-pump and water-pump drives or similar drives can be provided with suitable compensation for vibration reduction. However, of particular interest is a compensating device of this nature for camshafts in order to compensate the dynamic vibrations induced by internal combustion engines. Due to the reduced dynamic components of vibrations in the traction drive or of the dynamic alternating torques in the driven shaft, it is possible, for example on the power train between the crankshaft and the camshaft, to dimension the timing chain or an appropriate belt significantly lighter and more slender. When the compensating device is mounted on the camshaft side, there is furthermore an effect independent of spread, so that for an angular adjustment on the camshaft, the effect of the compensating device remains unchanged.

A favourable embodiment provides for at least one compensating mass which is movable in an arc in or counter to the rotational direction of the shaft. Due to the rotation of the compensating mass about the axis of the driven shaft along part of the circular line which the compensating mass describes about the axis of the shaft, with an appropriately balanced distribution of the compensating masse(s) relative to the shaft, the mass relationships are not changed despite the movement of the compensating mass, so that the static momental relationships in the driven shaft remain essentially unchanged. Instead of a circular movement of the compensating mass the at least one compensating mass can be movable on a tangent of a circle about the axis of the shaft in or counter to the rotational direction of the shaft. Through the tangential movement of the compensating mass the tangential force excitation due to the actuators can be completely converted into a compensating torque on the driven shaft with which the dynamic vibration components in the drive means of the traction drive can be compensated or reduced.

An effective embodiment provides for a restoring mechanism which is arranged on the at least one compensating mass for restoring the movement of the compensating mass. A restoring mechanism of this nature, for example a spring device or the application of an elastic material, for example, vulcanised onto the compensating mass, with a limited movement of the compensating mass relative to the traction drive facilitates the use of a simple and effective actuating mechanism, in particular a tangential or linear actuator. To reduce the components and to restrict the production costs, the at least one compensating mass can be arranged movably on a support by means of the restoring mechanism. The application through vulcanisation of the at least one compensating mass facilitates particularly simple fitting, in particular also with regard to the low actuation path of the mass which is possible with the device according to the invention.

Another embodiment provides for the tangential actuator being formed as a piezoelectric element. With a relatively small installation space requirement a piezoelectric element is a simple and effective actuating mechanism and is furthermore relatively economical. To optionally save on the required restoring mechanism, the piezoelectric element can be formed as a double-acting piezoelectric element to move the at least one compensating mass in the compression and tension directions.

For the active adjustment of the compensating device a controller for controlling the at least one actuating mechanism can be provided. The controller facilitates not only a suitable control of the actuating mechanism for changing rotational speeds, but also a reaction to combined vibrations of various orders. Here, in particular for the compensation of combined vibrations during one revolution of the shaft, a continuous adjustment of the compensating mass occurs, so that an adjusting displacement of the compensating mass with a whole series of different deflection positions is already produced with one revolution of the shaft. Apart from a control of the at least one actuating mechanism in dependence of the engine characteristic, also an active control in dependence of the momentary load torque on the driven shaft is possible. Here, a sensor for acquiring the load torque or the dynamic portion of the load torque can be provided on the driven shaft, supplying an appropriate input quantity for the control. Preferably, this sensor can be a strain gauge which can be simply fitted to the shaft, reacts fast and is economical. Alternatively, the sensor can be a piezoelectric element, which must be placed between two constituent parts of the driven shaft and when excited, produces a voltage proportional to the load torque, which in turn can be used directly as the input voltage for the actuating mechanism or the actuator, similarly preferably a piezoelectric element.

Preferably, a mass support permanently arranged on the shaft can be provided and the at least one compensating mass formed in an annular or circular shape and arranged for rotation on a mass support. With a uniformly homogeneously or periodically distributed annular or circular shaped compensating mass, which is arranged for rotation on the mass support, an essentially kinematic compensation torque can be provided just with one single actuating mechanism. With a rotation of an annular shaped compensating mass about the axis of the shaft additional dynamic torques can be almost completely avoided, because the compensating mass is uniformly distributed around the axis of rotation. Alternatively to avoid additional dynamic torques, at least two compensating masses can be provided and the compensating masses distributed uniformly around the shaft, i.e. arranged on the mass support uniformly in relation to their angular position and spacing to the axis of the shaft. Here, for uniform distribution two compensating masses are arranged offset by 180°, three masses offset by 120°, four masses offset by 90°, etc. in order not to produce any imbalance. Through the uniform arrangement of several compensating masses, with a similar movement of all masses, the effect of external forces on the driven shaft can be prevented, additional dynamic torques can be essentially avoided and the tangential force excitation of the compensating masses can be completely converted into an appropriate compensation torque on the driven shaft. Furthermore, through the uniformly distributed fitting of the at least one compensating mass also no additional bearing stress on the driven shaft arises, because the compensating device according to the invention essentially remains externally force-free.

An advantageous embodiment provides for at least one actuating mechanism arranged on the mass support. In this way the compensating device according to the invention can avoid contact to stationary contours in the vicinity of the driven shaft. Since therefore the relative position of the actuating mechanism with respect to the compensating mass does not change, the actuating mechanism can be operated with a relatively small relative speed and the required compensating torque applied directly to the compensating mass arranged on the mass support by a suitable actuator. At least two actuating mechanisms can be provided and the actuating mechanisms arranged uniformly about the shaft for a uniform movement and deflection of the compensating mass in order to avoid additional dynamic torques. The uniformly distributed arrangement of several actuating mechanisms about the driven shaft prevents an imbalance of the mass support, which is otherwise possible with a non-uniform force excitation. Preferably therefore, for each compensating mass arranged distributed on the mass support at least one actuating mechanism and with annular or circular shaped compensating masses at least two actuating mechanisms are provided.

In a further embodiment the driven shaft and the drive wheel are formed movable relative to one another, wherein the at least one actuating mechanism is arranged between the drive wheel and the driven shaft in order to move the driven shaft and the drive wheel relative to one another in and/or counter to the rotational direction of the shaft for the reduction of vibration in the traction drive. This embodiment dispenses with additional compensating masses and mass supports, but instead uses the existing components of the traction drive in order to bring about a compensation torque on the shaft for the reduction of vibration in the traction drive.

A variant of the present invention provides for the driven shaft being formed as a camshaft with a camshaft adjusting system for the angular adjustment of the control time, wherein the camshaft is formed simultaneously as the compensating mass and can be moved relative to the drive wheel in and/or counter to the rotational direction of the shaft for vibration reduction in the traction drive. Through the combination of the torque compensation device with an existing camshaft adjusting system the existing camshaft, which is movable relative to the drive wheel held fixed by the drive means, can be used simultaneously as the compensating mass for the torque compensation. In this way the overall existing moment of inertia of the camshaft and the resulting forces in the drive means remain essentially unchanged. Furthermore, through this combination of components the constructive outlay for the drive wheel, preferably a sprocket for engaging a timing chain, and its manufacturing costs are reduced.

A particularly efficient embodiment of the combination of the camshaft adjusting system and the torque compensation provides for the camshaft adjusting system having a control time adjusting mechanism, wherein the at least one actuating mechanism for vibration reduction is connected in series with the control time adjusting mechanism, or wherein the at least one actuating mechanism is formed by the control time adjusting mechanism. The actuating mechanisms connected in series can use the same connection components for the movable mass and simultaneously move the mass independently of the control of the respective other mechanism. Through the saving of an actuating mechanism, a common actuating mechanism for the angular adjustment of the control time and for vibration reduction of the traction drive not only reduces the constructive outlay, but can also be controlled by a single controller without superimposition.

The invention also relates to the use of a camshaft adjusting system for the angular adjustment of the control time of a camshaft as a compensating device for vibration reduction in a traction drive, wherein an actuating mechanism formed as a tangentially acting actuator moves the camshaft in and/or counter to the rotational direction of the shaft for vibration reduction in the traction drive. The use of a camshaft adjusting system for the simultaneous vibration reduction in the traction drive facilitates the saving of additional compensating masses and a common mutually adapted control of the actuating mechanisms. The synergetic effects between a camshaft adjusting system and a compensating device for vibration reduction can therefore simplify the design and also help to save costs.

Furthermore, the present invention relates to a method of vibration reduction in a traction drive, in particular for an internal combustion engine, with a driven shaft, a drive wheel, which is coupled to the driven shaft, and a drive means, wherein at least one actuating mechanism moves at least one compensating mass relatively movable in the traction drive, wherein the method comprises the control of the at least one actuating mechanism by means of a control, the movement of the at least one compensating mass by means of the actuating mechanism in or counter to the rotational direction of the shaft and the production of a compensating torque on the driven shaft. Through the method according to the invention a compensating torque can be produced in a driven shaft for compensating the dynamic portions of the vibrations or of the load torque suitable to the vibrations in the power train or to the load torque to be compensated. Here, the required movement displacement of the compensating mass is relatively low, sometimes only a few millimetres or with an appropriately large compensating mass only fractions of millimetres, and can be directly applied to the compensating mass with an actuating mechanism similarly circumferential to the axis of the shaft. In this method the compensating mass is force-excited by the essentially tangentially acting actuating mechanism, by means of which a compensation torque is directly produced on the driven shaft. Apart from the minimal deflection of the compensating mass by the actuating mechanism also the required mass is small due to the direct action on the driven shaft so that the additional static moments produced with this method turn out to be low. Due to the direct action of the method via the actuating mechanism and the compensating mass, the arrangement of the mass and its displacement capability can be optimally and mutually matched. Furthermore, through the direct action the method according to the invention also lends itself to a closed-loop or open-loop control of the method in relation to the actual dynamic torque stresses occurring in the driven shaft or the dynamic vibration components in the traction drive. Overall through this method, the problem of vibrations in the traction drive or the alternating torques thereby induced in a driven shaft can be significantly reduced and even almost eliminated, by means of which the dimensioning of the drive means and drive wheel of a traction drive with an internal combustion engine can be reduced with a simultaneous increase in the service life of the drive chain or belt.

As a favourable aspect, the method of vibration reduction can comprise the determination of the dynamic torque component on the driven shaft and the control of the at least one actuating mechanism taking into account the dynamic torque component. In this way the load torque actually present on the driven shaft or its dynamic components can be taken into account in the control of the actuating mechanism. For a direct measurement of the dynamic torque component the driven shaft can be fitted with a sensor by means of which the actual applied dynamic torque component on the driven shaft is determined. Furthermore, the dynamic torque on the driven shaft or the dynamic vibration behaviour in the traction drive can be determined with the aid of indirect parameters, in particular the engine characteristic of an internal combustion engine, e.g. rotational speed, drive torque, etc. The determination of the dynamic torque component and the vibration behaviour of the traction drive with the aid of indirect parameters facilitates dispensing with corresponding sensors on the driven shaft.

A particular modification of the method of vibration reduction provides for the driven shaft being formed as the camshaft with a camshaft adjusting system for the angular adjustment of the control time and the camshaft being movable relative to the traction drive, and the method further comprises the control of the at least one actuating mechanism or a control time adjusting mechanism of the camshaft adjusting system for the angular adjustment of the camshaft arranged in series with the actuating mechanism. The combination of the method of torque compensation with the control time adjustment of a camshaft facilitates a series of synergistic effects, which not only limit the moment of inertia and the chain forces essentially to the already existing extent of an appropriate control time adjustment, but rather, in particular with a common control, prevent opposing movements of the compensating mass.

Figure 3:
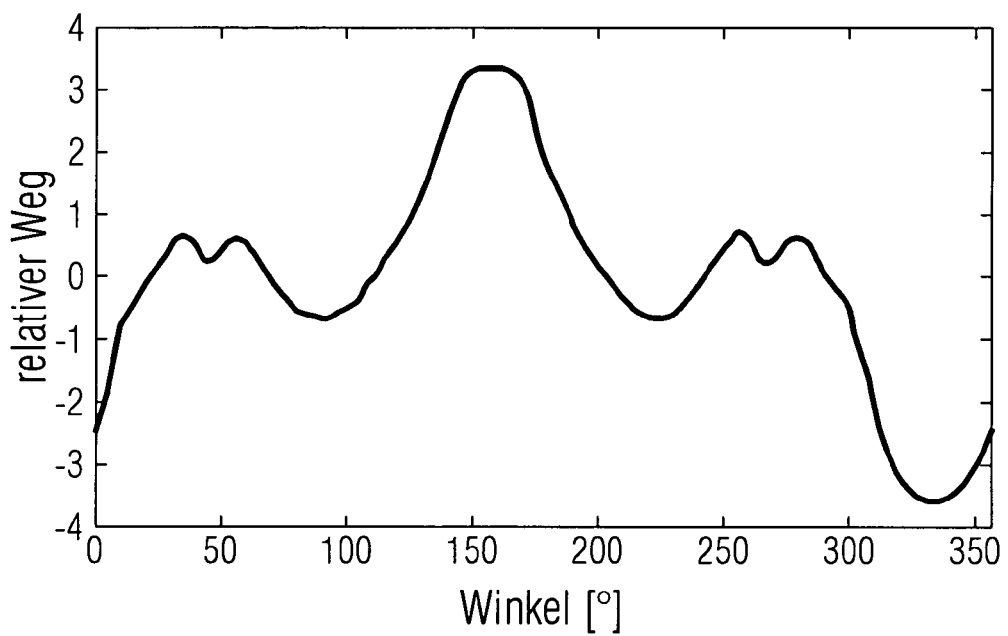
Figure 4A:
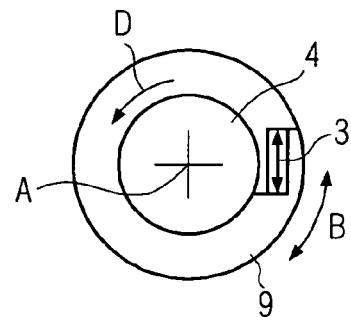
Figure 4B:
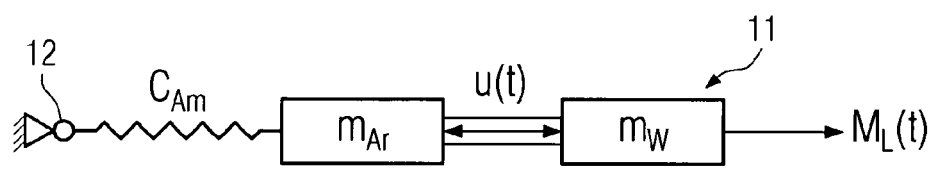
Figure 5:
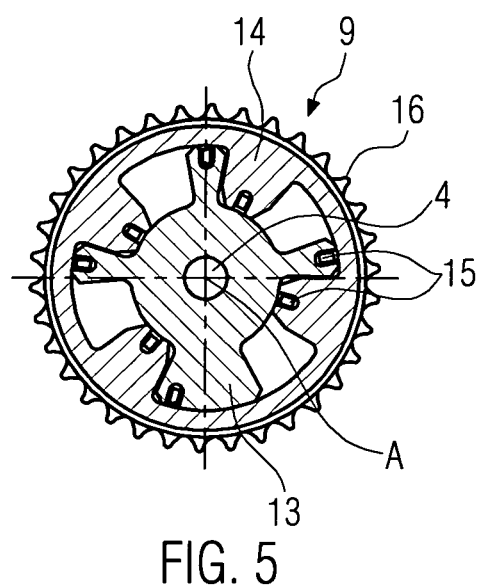

The invention is explained for advantageous embodiments in more detail in the following based on a drawing. The following are shown:

FIG. 1a a face-side plan view of a compensating device with a movably arranged compensating mass for a traction drive according to the invention, FIG. 1b a face-side plan view of another compensating device with an annular shaped compensating mass for a traction drive according to the invention, FIG. 1c a face-side plan view of a further compensating device with two mutually offset compensating masses for a traction drive according to the invention, FIG. 1d an analogy block diagram for the compensating devices from FIGS. 1a to 1c, FIG. 2 a section in the longitudinal direction through a driven shaft with a compensating device for a traction drive according to the invention, FIG. 3 the relative displacement of the compensating masses versus the rotated angle of the driven shaft in a traction drive according to the invention, FIG. 4a a face-side plan view of another compensating device with a movably arranged shaft for the torque compensation for a traction drive according to the invention, FIG. 4b an analogy block diagram for the compensating device in FIG. 4a, and FIG. 5 a section through a sprocket and a camshaft with a camshaft adjusting system for use as compensating device for vibration reduction in a traction drive according to the invention.

FIGS. 1a to 1c show various embodiments of a compensating device for vibration reduction in a traction drive in a face-side plan view. Here, in each case one or two compensating masses 2 are movably arranged on the mass support 1 of the compensating device and the compensating masses 2 are in each case provided with an actuating mechanism 3, which can move the compensating mass 2 in or counter to the rotational direction D of the shaft 4.

In the compensating device illustrated in FIG. 1a only one compensating mass 2 is arranged on the mass support 1 spaced to the axis A of rotation of the driven shaft 4. This compensating mass 2 is moved by an actuating mechanism 3, which is supported on the mass support 1, preferably on a circular arc of the centre of mass of the compensating mass 2 about the axis A of rotation in or counter to the rotational direction of the shaft. Apart from the desired compensating torque for vibration reduction, the movement of this single eccentrically arranged compensating mass 2 also produces a static and a dynamic torque, which however can be kept low with a low mass and a small spacing to the axis A of rotation. The dynamic component can be reduced to the function-dependent component through the appropriate positioning of a counter mass offset by 180°.

FIG. 1b illustrates another compensating device for vibration reduction in which, in contrast to FIG. 1a, the compensating mass 2 movably arranged on the mass support 1 is formed with an annular shape, wherein the centre of mass of the annular shaped compensating mass lies in the axis A of rotation of the driven shaft 4. In the embodiment shown the annular shaped compensating mass 2 is moved by an actuating mechanism 3. With the circular-arc shaped movement B of the annular shaped compensating mass 2 present here on a circular arc about the axis A of rotation of the driven shaft 4 no additional dynamic torques arise with the production of the compensating torque for the vibration reduction, because the mass relationships do not change relative to the axis A of rotation of the shaft. However, in this case during a tangential movement with a movement component outside of the circular-arc shaped movement B a slight additional dynamic torque is produced on the shaft, wherein with a specific excitation or arrangement also the radial movement component can have an additional compensating effect.

FIG. 1c illustrates a compensating device with two compensating masses 2, wherein the compensating masses 2 are mutually offset by 180° and are arranged with the same spacing to the axis A of rotation of the driven shaft 4 on the mass support 1. Both compensating masses 2 are in each case connected to an actuating mechanism 3, which is supported on the mass support 1 and rotates the compensating masses 2 in the same direction relative to the axis A of rotation in or counter to the rotational direction D of the shaft, i.e. with an arrangement of the compensating masses 2 offset by 180° the direction of movement is also offset by 180°. The offset arrangement and movement of the compensating masses 2 prevents the production of additional dynamic torques or results in the essential compensation of arising additional dynamic torques, irrespective of whether the compensating masses 2 execute a circular movement B or a tangential movement with a non-circular arc shaped component.

FIG. 1d illustrates an analogy block diagram of a traction drive 11 according to the invention for the compensating devices illustrated in FIGS. 1a to 1c. At node 12 the traction drive is defined relative to the internal combustion engine, wherein the traction drive at node 12 engages the drive means with the stiffness $C_{Am}$. On the drive means with the stiffness $C_{Am}$ the drive wheel and the shaft, which are firmly joined together, are coupled to the mass $m_{Ar+w}$ and the load torque $M_L(t)$, which is to be compensated, acts on the shaft. The actuating mechanism 3 with the time-dependent actuating movement u(t) acts between the drive wheel and the shaft with the mass $m_{Ar+w}$ and the compensating mass 2 with the mass $m_{Am}$. Through the actuation movement u(t) of the mass $m_{Am}$ a compensation torque $M_A(t)$, which arises as the moment of inertia of the relatively accelerated mass $m_{Am}$, is produced for vibration reduction in the traction drive.

FIG. 2 illustrates a section in the longitudinal direction through a compensating device corresponding to FIG. 1b. The mass support 1 is here firmly joined to the driven shaft 4 and rotates together with the shaft 4 in a circular shape about the axis A of rotation. The mass support 1 can here be formed as a separate component, independent of the actual function of the driven shaft 4, or the mass support 1 can be used simultaneously to its function as support of the compensating masses, and optionally the actuating mechanisms, in the traction drive as the drive or output wheel of the shaft 4. The mass support 1 is in this embodiment provided with an annular or circular shaped compensating mass 2, which is mounted rotationally about the axis A of rotation of the shaft 4 or at least movably on the mass support 1. The actuating mechanism 3, similarly arranged on the mass support 1, moves the compensating mass 2 in or counter to the rotational direction D of the shaft 4, wherein the actuating mechanism 3 is formed here as a piezoelectric element which moves to and fro. With a piezoelectric element of this nature, which moves in the tension and compression directions and exerts a force, a restoring mechanism can be omitted. The actuating mechanism 3 is actively controlled by a controller 5 via control lines 8 in order to compensate the dynamic components of the load torque M present on the driven shaft 4 or to reduce the vibrations in the traction drive. For the active control of the actuating mechanism 3 the controller 5 is supplied via the signal line 7 with an input quantity from a strain gauge 6 arranged on the driven shaft 4.

For the compensation or reduction of the vibrations in the traction drive the compensating mass 2 must be deflected in different ways in dependence of the current angular adjustment of the driven shaft 4 during one revolution corresponding to the currently prevailing vibration behaviour or the dynamic torques present in the driven shaft 4. FIG. 3 illustrates as an example the relative displacement of the compensating mass 2 in dependence of the angular position of the driven shaft 4 during one revolution of the shaft. Here, during one revolution of the shaft a continuous forward and reverse movement of the compensating mass 2 occurs as well as dwelling of the compensating mass at a deflected position. The absolute displacement of a compensating mass 2 is dependent on its mass and position with respect to the axis A of rotation of the driven shaft 4. From the relative displacement of the compensating mass 2 in FIG. 3 it can be seen that the compensating mass 2 is not just simply moved, but rather is also continuously deflected in dependence of the momentary vibration situation. Here, it must be considered that this angular dependent displacement profile is processed by the compensating device in very short time periods, for example within 40 ms at an engine speed of 3,000 rpm.

FIG. 4a illustrates another embodiment of a compensating device of a traction drive according to the invention for vibration reduction. In this embodiment the movably arranged compensating mass is formed directly by the driven shaft 4, i.e. the traction drive does not require a mass support 1 for the arrangement of the compensating mass 2. If the fixing of the drive wheel in the control mechanism drive facilitates a movement relative to the traction drive, the drive wheel or another suitable component can alternatively also function as the compensating mass and be moved to produce a compensating torque.

The compensating device illustrated in FIG. 4a can here not only be used for producing a compensating torque for compensating the dynamic component of the load torque M, i.e. for vibration reduction in the drive means, but rather simultaneously also for the angular adjustment of the shaft, here a camshaft, and thus cause a change in the ignition timing in the internal combustion engine. With known camshaft adjusting systems for control time adjustment the drive wheel 9, which simultaneously can also have teeth for engagement in a drive chain or a running surface for a belt, is arranged around the shaft 4, movable relative to the driven camshaft 4 and is provided with a control time adjusting mechanism, which facilitates a movement of the drive wheel 9 with respect to the camshaft 4 in dependence of a desired engine performance characteristic. With the relative movements of the camshaft 4 with respect to the drive wheel 9 the position of the drive wheel 9 can also adjust with respect to the camshaft 4 depending on the reference point.

With this actuation device a movement of the driven shaft 4 acting as the compensating mass occurs by means of the actuating mechanism 3, similarly in or counter to the rotational direction D of the shaft 4. Since this shaft 4 is movable and guided about its own axis A with respect to the drive wheel 9, the movement of the "inertial body" occurs in a circular arc shaped movement B about the axis A of rotation of the shaft 4. Here, the shaft 4 as a camshaft can be moved by the actuating mechanism 3 both for the long-term angular adjustment of the control time as well as for the momentary production of a compensating torque on the camshaft 4. Apart from a single actuating mechanism 3 two actuating mechanisms can also be provided in series, which independently of one another realise the angular adjustment of the camshaft with respect to the drive chain sprocket and the movement of the shaft with respect to the traction drive for producing a compensating torque matching the current angular position.

FIG. 4b illustrates an analogy block diagram of a traction drive 11 according to the invention for the compensating device illustrated in FIG. 4a. The traction drive at node 11 is in turn fixed relative to the internal combustion engine and the drive means of the traction drive with a stiffness of $C_{Am}$ is arranged on the second side of node 12. The drive wheel with the mass $m_{Ar}$ is coupled to the drive means with the stiffness $C_{Am}$. The actuating mechanism 3 with the time-dependent actuating movement u(t) acts between the drive wheel with the mass $m_{Ar}$ and the driven shaft with the mass $m_w$ on which the load torque $M_L(t)$ of the driven camshaft is applied. Through the actuation movement u(t) of the driven shaft with the mass $m_w$ a compensation torque $M_A(t)$ is produced in the traction drive for vibration reduction in the traction drive without having to integrate an additional mass into the traction drive system.

FIG. 5 illustrates a section through a sprocket and a camshaft with a camshaft adjusting system which can be used for vibration reduction in a traction drive according to the invention through the use of a tangentially acting actuator. The drive wheel 9 is divided into an inner part 13 and an outer part 14, wherein the inner part 13 and the outer part 14 of the drive wheel 9 can be moved sliding relative to one another through suitable supports 15. The outer part 14 of the drive wheel 9 is provided with a toothed ring 16 for engagement of the drive means formed as a drive chain. The inner part 13 of the drive wheel 9 is firmly joined to the shaft 4, e.g. by press fitting, and rotates together with the shaft 4 about the axis A. The arrangement of one or several actuating mechanisms 3 between the arms of the inner part 13 protruding outwards and the arms of the outer part 14 of the drive wheel 9 which extend inwards facilitates a movement of the shaft 4 with the inner part 13 in and/or counter to the rotational direction D of the driven shaft on a circular arc B about the axis A relative to the outer part 14 of the drive wheel 9 and drive chain engaging it, which fixes the traction drive with respect to the internal combustion engine.

In the following the working principle and function of the traction drive described above and the compensating device for vibration reduction of a driven shaft are explained in more detail.

Through the relative movement of the compensating masses 2 with respect to the assigned traction drive or the driven shaft 4, the compensating device according to the invention produces a compensation torque which, with suitable control of the actuating mechanism, leads to the elimination or reduction of the dynamic components of the load torque applied to the driven shaft 4 and thus to vibration reduction in the traction drive itself. To reduce the dynamic components of the load torque M a periodic excitation of the compensating masses 2 by the actuating mechanism 3 is quite sufficient, which can be achieved mechanically by cams, springs or tooth-meshing of a contour which is stationary with respect to the driven shaft 4. With a pure periodical relative movement of this nature in particular the maximum dynamic torques occurring in the resonance range of the driven shaft 4 and therefore also the resonance vibrations in the traction drive can be reduced. On the other hand with an active control of the actuating mechanism 3 by means of a controller 5 elimination or reduction of the dynamic components of the load torque M or the vibrations over the complete speed range of the shaft 4 or at least over a large part of it can be achieved. An active control of the actuating mechanism 3 by the controller 5 can be realised both in dependence of the engine characteristic present as well as by means of measuring the actual dynamic torque present on the driven shaft 4 as a proportional quantity for the vibrations in the system.

With a traction drive according to the invention with a compensating device the required compensation torque is directly applied by means of the compensating mass 2 which can be rotated by an actuator in or counter to the rotational direction D of the shaft 4. The compensating masses 2 are tangentially force-excited by means of the actuating mechanism 3 formed as the actuator, e.g. a piezoelectric element, wherein a corresponding reactive torque is produced on the shaft for the compensation of the dynamic component of the load torque M and thus of the vibrations in the traction drive. Through the direct generation of torque only small relative displacements of the compensating mass 2 are necessary so that the required deflection displacements of the compensating masses 2 are in part only a few millimetres or with large masses less than one millimetre. This low deflection of the compensating mass 2 facilitates the use of fast actuating mechanisms 3, e.g. piezoelectric elements, which can be controlled, by means of which the compensating device can be used flexibly and the vibration compensation can be matched to the rotational speed. Through the direct production of torque by means of the tangential force excitation of the compensating masses 2 the resulting momental vector can also be displaced with respect to the axis A of rotation of the shaft 4 and thus the compensating masses 2 can be freely arranged and dimensioned in dependence of the relative displacements.

The direct application of force through the tangentially acting actuators facilitates the direct compensation of the dynamic component of the vibrations or of the measured load torque M. The load torque M present on a driven shaft 4 can here for example be measured by means of a strain gauge 6, the output voltage of which can be directly used as an input quantity for the actuating mechanism or actuator, or as an input quantity for a controller 5 controlling the actuating mechanism 3, wherein the controlled actuating mechanism 3 applies the required force for moving the compensating mass 2 essentially tangentially on the compensating mass 2, thus producing a corresponding compensation torque.

Furthermore, a direct control of the actuating mechanism 3 can be achieved in that the dynamic torque on the driven shaft 4 is acquired by means of a piezoelectric element, wherein the piezoelectric element can in principle be freely arranged on the system moved. A particularly practicable arrangement is a mirrored structure for the compensating device, wherein the piezoelectric element is mounted with one end on the mass support, whereas the other end is provided with a (small) mass. In this way the piezoelectric element produces an output signal which is proportional to the moment of inertia instead of to the elastic deflection. The measured and actuating quantities are then of the same differential order ($2^{nd}$ order/acceleration), by means of which a direct uncontrolled configuration for the compensation of the torques is possible. The output voltage of the piezoelectric element then acts directly as the input quantity for the actuating mechanism 3, for example similarly a piezoelectric element, which then applies the tangential force excitation of the compensating mass 2 in order to produce a compensation torque proportional to the dynamic component of the load torque M on the driven shaft 4.

In the case of a single mass the at least one compensating mass 2 of a torque compensating device according to the invention is preferably formed as an annular or circular shaped compensating mass 2, which is arranged pivotably about the axis A of rotation of the shaft on the mass support 1. This annular or circular shaped compensating mass 2 is put into rotation on a circular arc in or counter to the rotational direction of the shaft by the tangentially acting actuator. Since this annular or circular shaped compensating mass 2 rotates about the axis A of rotation of the driven shaft 4, no additional dynamic torques arise. A second way of preventing additional dynamic torques is the uniformly offset arrangement of several compensating masses 2 about the axis A of rotation of the shaft 4 with in each case the same spacing to one another and the same spacing to the axis A of rotation. As long as all individual compensating masses 2 are excited in the same way relative to the axis A of rotation, no additional dynamic torque arises, irrespective of whether excitation occurs on a circular arc or a tangent of a circle. Through the paired or uniform mounting of the compensating masses 2, with the same control of the compensating masses 2, the compensating device remains force-free externally, so that also no additional bearing stresses arise.

The present compensating device facilitates a torque compensation on a driven shaft with small compensating masses 2 and a small deflection of the compensating mass 2 via tangentially force-excited actuators. Due to the low additional compensating masses required or due to the omission of additional masses, the additional static moments due to the compensating device can also be kept low, for example if the mass support 1 is used simultaneously as the drive and output wheel of the shaft 4 or the driven shaft 4 itself acts as the compensating mass 2. Also with an incompletely balanced arrangement of compensating masses 2 or unequal or one-sided movements of the compensating mass 2 the additional dynamic torques are relatively low due to the small deflection displacements and low masses.

Another possible embodiment provides for a pure compensating device for vibration reduction in a traction drive according to the invention, where in the case of a control drive, installation takes place on the camshaft side to achieve an effect independent of spread.

With the combination of a camshaft adjusting system of conventional design illustrated in FIG. 4a in a traction drive with a compensating device corresponding to the present invention, the operating principle of the individual functions does not change, although both functions are realised by one single device. With this device the angular adjustment of the control time occurs through the actuating mechanism 3 in dependence of an adjustment required for the respective performance range or operating state of the engine which is completely independent of the vibrations in the traction drive or of the momentary load torque M on the camshaft. In contrast to the angular adjustment of the control time the control of the vibration reduction depends directly on vibrations or the load torque M present on the shaft 4 or its dynamic components, which in turn depend on the momentary acceleration of the shaft 4 by means of the drive wheel. In this combined device the control of the compensating mass for the vibration reduction is superimposed with the angular adjustment of the control time, although the single functions act at different levels. The vibrations of the traction drive or the dynamic component of the load torque M change even in the course of a few degrees of rotation of the shaft 4 about the axis A of rotation, whereas the control time adjustment realises, independent of the shaft rotation and the angular position, a longer term positional adjustment of the camshaft 4 for its drive by the drive means, i.e. for a very large number of revolutions of the camshaft 4 or for a certain engine operating range. To master these functions acting at different levels, the actuating mechanism 3 must make an appropriate stroke available in or counter to the rotational direction D of the camshaft 4 as well as the required reaction speed for producing a compensation torque.

The invention claimed is:

1. A chain drive for an internal combustion engine, comprising:
    a compensating device for vibration reduction, said compensating device including:
        a driven shaft rotatable about an axis of rotation,
        a drive wheel, which is coupled to the driven shaft,
        a drive chain,
        at least one compensating mass, the compensating mass being movable relative to the drive wheel, wherein the at least one compensating mass is movable in a circular arc about the axis of rotation of the driven shaft, and
        at least one actuating mechanism for moving the at least one compensating mass relative to the drive wheel, said at least one actuating mechanism configured for applying a force on the compensating mass in a tangential direction relative to the drive wheel,
    wherein the at least one actuating mechanism is arranged between the drive wheel and the at least one compensating mass and is formed as a tangentially moving, actively acting actuator in order to move the compensating mass and the drive wheel relative to one another by applying the force in the tangential direction in or counter to the rotational direction of the shaft to create a compensating torque on the driven shaft for vibration reduction in the chain drive.

2. The chain drive of claim 1, wherein the at least one compensating mass is formed directly by the driven shaft.

3. The chain drive of claim 2, wherein the driven shaft is formed as a camshaft with a camshaft adjusting system for the angular adjustment of the control time, wherein the at least one compensating mass formed by the camshaft can be moved about the axis relative to the drive wheel for vibration reduction in the chain drive.

4. The chain drive of claim 3, wherein the camshaft adjusting system has a control time adjusting mechanism, wherein the at least one actuating mechanism for the vibration reduction is connected in series with the control time adjusting mechanism, or wherein the at least one actuating mechanism is formed by the control time adjusting mechanism for the torque compensation.

5. The chain drive of claim 1, wherein at least two actuating mechanisms are provided and the actuating mechanisms are evenly arranged around the shaft.

6. The chain drive of claim 1, wherein the tangentially moving, actively acting actuator is formed as a piezoelectric element.

7. The chain drive of claim 6, wherein the piezoelectric element is formed as a double-acting piezoelectric element to move the at least one compensating mass in the compression and tension directions.

8. The chain drive of claim 1, wherein a return mechanism is provided between the at least one compensating mass and the drive wheel, said return mechanism being arranged for restoring the movement of the compensating mass.

9. The chain drive of claim 1, wherein a controller is provided for controlling the at least one actuating mechanism.

10. The chain drive of claim 9, wherein a sensor for acquiring the load torque in the driven shaft is provided.

11. The chain drive of claim 10, wherein the sensor is a strain gauge.

12. The chain drive of claim 10, wherein the sensor is a piezoelectric element.

13. A method for vibration reduction in a chain drive, said chain drive comprising a driven shaft that is rotatable about an axis of rotation, a drive wheel, which is coupled to the driven shaft, and a drive chain, wherein at least one actuating mechanism moves at least one compensating mass by applying a force in a tangential direction relative to the driven shaft, the method comprising:
    controlling the at least one actuating mechanism for vibration reduction in the chain drive by means of a control,
    moving the at least one compensating mass relative to the drive wheel by means of the actuating mechanism about the axis of the driven shaft in and/or counter to the rotational direction of the shaft, wherein the at least one compensating mass is movable in a circular arc about the axis of rotation of the driven shaft, and
    producing a compensation torque on the driven shaft, said compensation torque being adapted to compensate a dynamic torque component present in the driven shaft during operation.

14. The method of vibration reduction as set forth in claim 13, further comprising:
    determining the dynamic torque component on the driven shaft, and
    controlling the at least one actuating mechanism based on the dynamic torque component.

15. The method of vibration reduction as set forth in claim 14, wherein the dynamic torque component of the driven shaft is determined by means of a sensor on the driven shaft.

16. The method of vibration reduction as set forth in claim 14, wherein the dynamic torque component on the driven shaft is determined based on the engine characteristic of the internal combustion engine and speed and driving torque.

17. The method of vibration reduction as set forth in claim 13, wherein the driven shaft is formed as a camshaft with a camshaft adjusting system for the angular adjustment of the control time and the camshaft is movable relative to the chain drive, the method further comprising:
    controlling the at least one actuating mechanism or a control time adjusting mechanism of the camshaft adjusting system arranged in series with the actuating mechanism for the angular adjustment of the camshaft.

* * * * *